March 13, 1962

S. G. BRADY ET AL 3,024,577

HELICAL GEAR OR SPLINE GRINDER

Filed March 2, 1959

INVENTORS
SAMUEL G. BRADY
WILHELM DRALLE
BY
*Whittemore, Hulbert & Belknap*
ATTORNEYS March 13, 1962  S. G. BRADY ETAL  3,024,577
HELICAL GEAR OR SPLINE GRINDER Filed March 2, 1959  4 Sheets-Sheet 2

INVENTORS
SAMUEL G. BRADY
BY WILHELM DRALLE
*Whittemore, Hulbert & Belknap*
ATTORNEYS

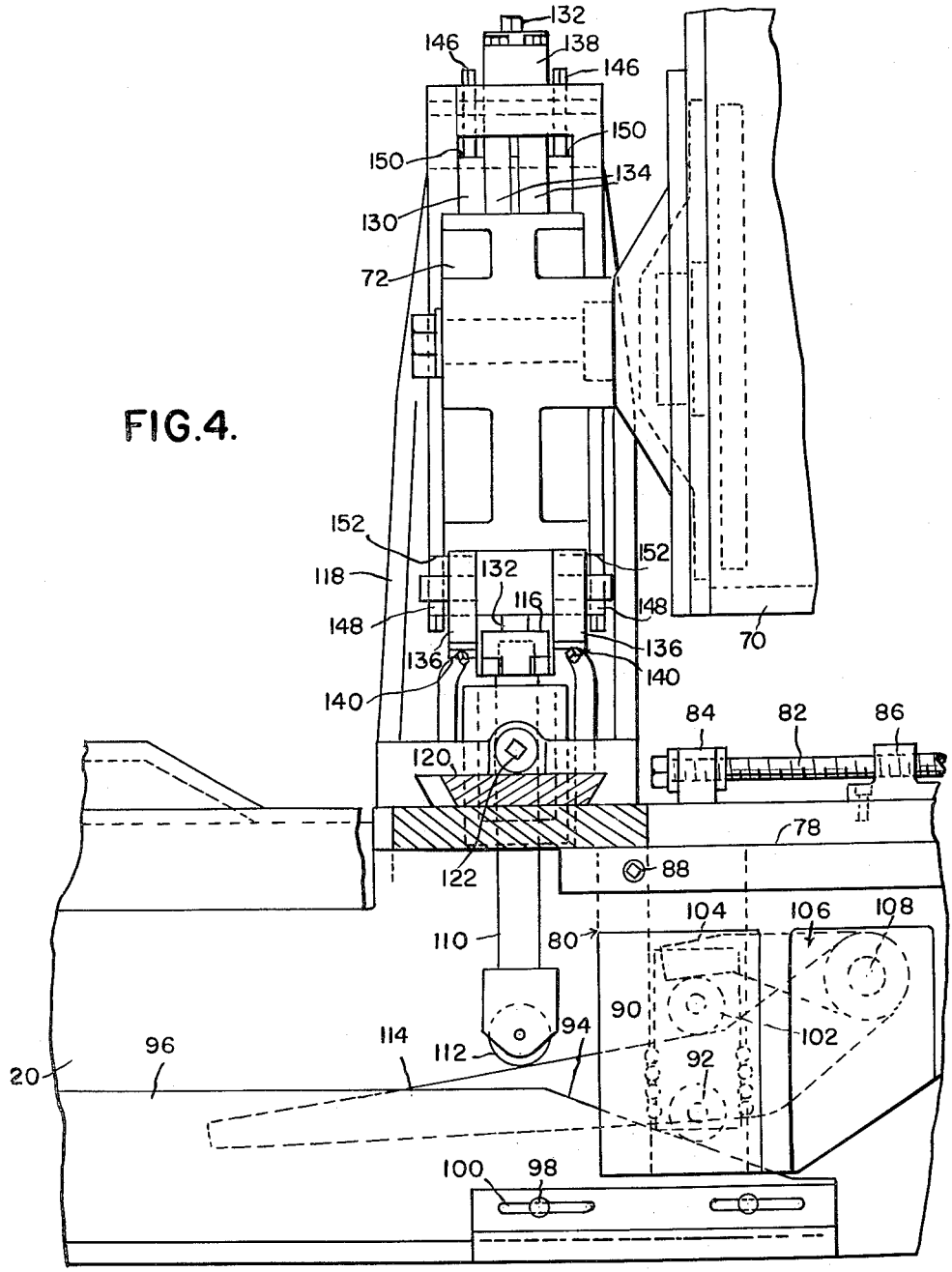

March 13, 1962   S. G. BRADY ETAL   3,024,577
HELICAL GEAR OR SPLINE GRINDER
Filed March 2, 1959   4 Sheets-Sheet 4

INVENTORS
SAMUEL G. BRADY
BY WILHELM DRALLE
Whittemore, Hulbert & Belknap
ATTORNEYS

United States Patent Office 3,024,577
Patented Mar. 13, 1962

3,024,577
HELICAL GEAR OR SPLINE GRINDER
Samuel G. Brady, Birmingham, and Wilhelm Dralle, Detroit, Mich., assignors, by mesne assignments, to Ex-Cell-O Corporation, Detroit, Mich., a corporation of Michigan
Filed Mar. 2, 1959, Ser. No. 796,604
12 Claims. (Cl. 51—95)

This invention relates to a helix forming apparatus and refers more particularly to a helical gear or spline grinding machine.

One object of the invention is to provide a helical gear grinding machine or the like with efficient and easily adjustable mechanism for changing the helix angle formed.

Another object of this invention is to provide apparatus for rotating a table mounted workpiece holder as the table moves longitudinally relative to a grinding wheel, which apparatus includes a lever pivotally carried by the table and cam means for engaging and pivoting the lever during longitudinal travel of the table. The lever engages the workpiece holder at a predetermined distance from the lever axis to rotate the workpiece holder during lever pivoting and the lever is adjustable to vary the helix angle.

It is another object of this invention to provide a sector attached to the workpiece holder and having actuating means engaged by the lever to rotate the sector as the lever moves along the cam means.

These and other objects will become more apparent when descriptions of preferred embodiments of this invention are made in connection with the drawings, in which:

FIG. 4 is an enlarged view of the sector actuating mechanism shown in FIG. 1;

Figure 1:
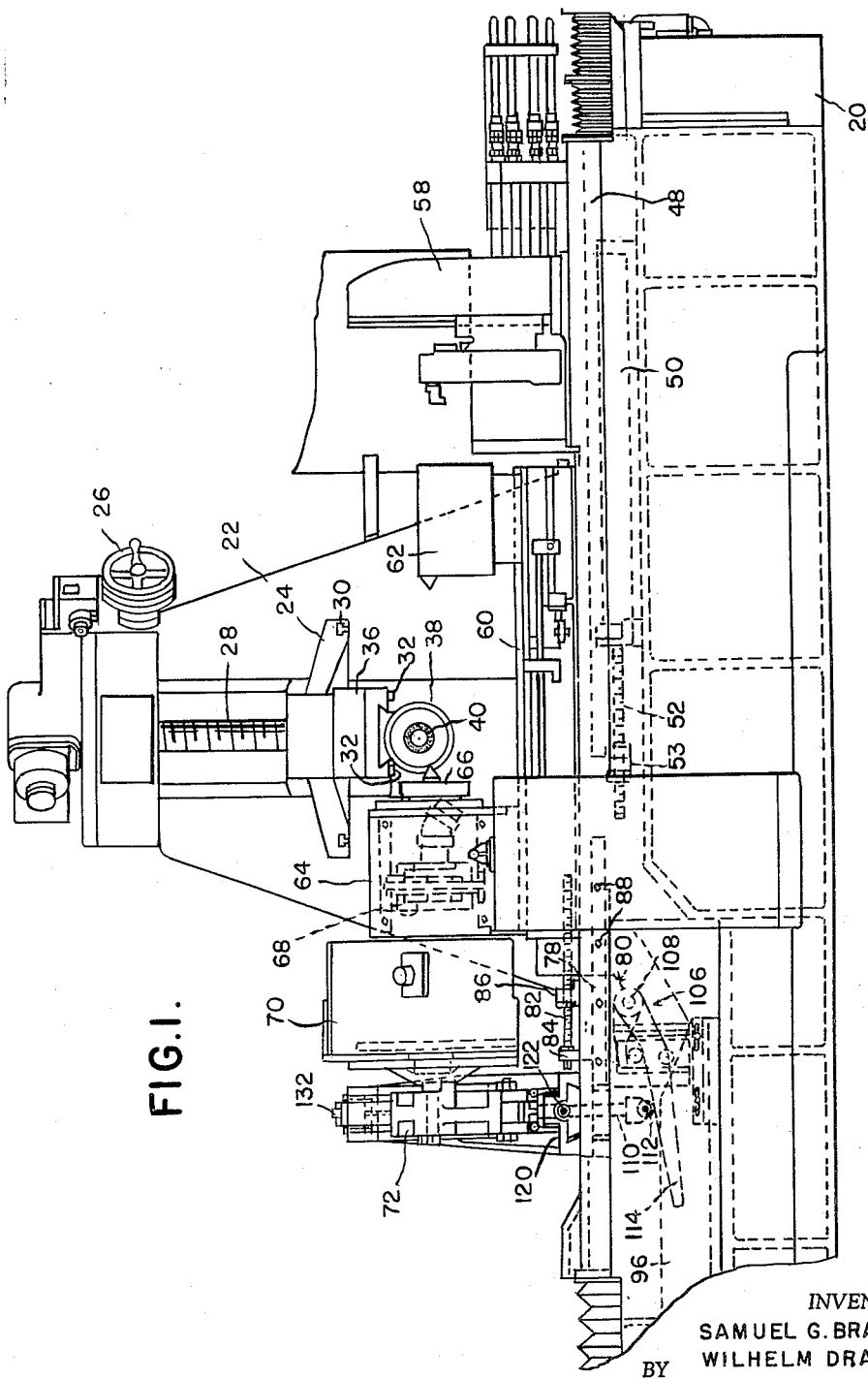
FIG. 1 is an elevational view of apparatus embodying the invention.
Figure 2:
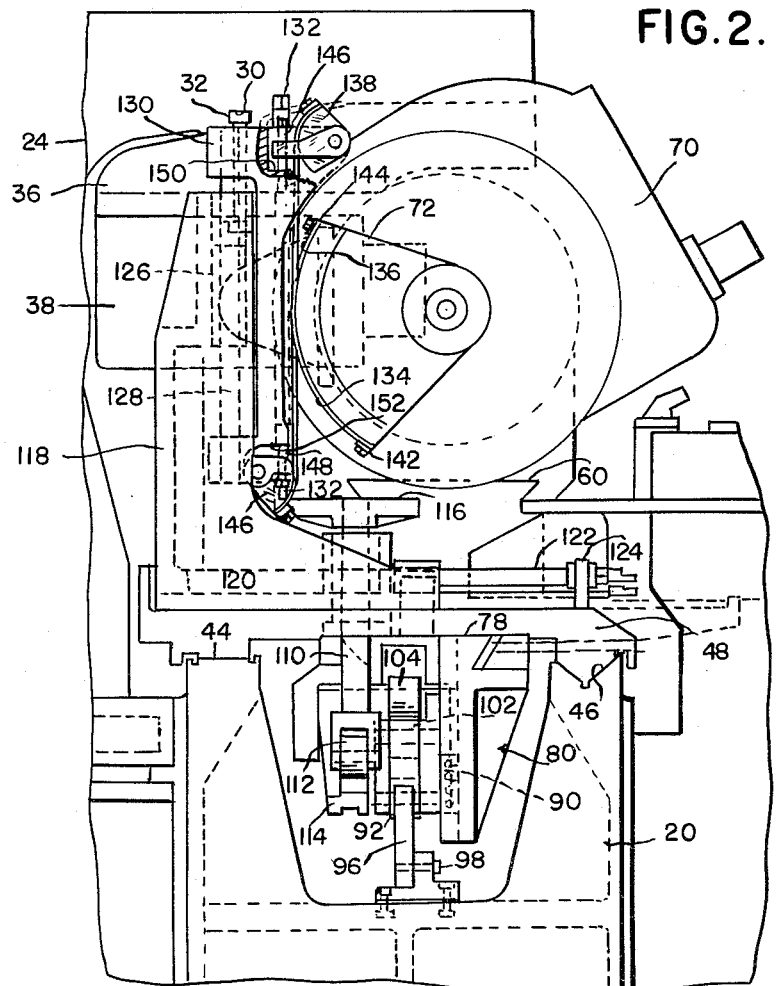
FIG. 2 is a fragmentary end elevation of the apparatus shown in FIG. 1.
Figure 3:
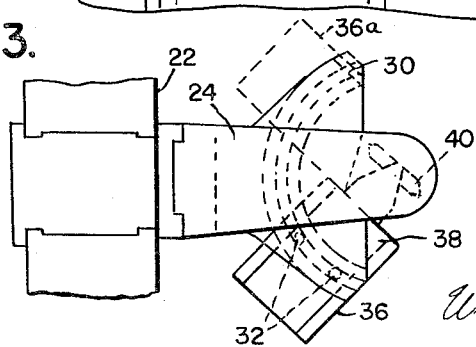
FIG. 3 is a partial plan view.

In the drawings, and particularly in FIGS. 1–4, there is shown a helical gear or spline grinding machine embodying the invention. A base 20 has fixed thereto an upright post 22 to which is attached for vertical sliding movement a grinding wheel support 24 which is movable along post 22 through rotation of crank 26 which rotates screw 28. Formed along an outer portion of support 24 is an arcuate T-slot 30 (FIGS. 1 and 3) in which are fitted the heads of a pair of bolts 32 which clamp the wheel mounting 36 in adjusted arcuate position. The bolts are slidable in the groove for adjustment, and an adjusted position of wheel mounting 36 is shown in FIG. 3. Attached in dovetailed relation to mounting 36 is a grinding wheel motor 38 which provides rotative power to grinding wheel 40. With this construction, grinding wheel 40 is movable vertically through rotation of crank 26, is movable arcuately in T-slot 30 and is movable horizontally through the dovetailed connection with mounting 36 to provide a wide range of grinding wheel positions.

Formed on base 20 are ways 44, 46 (FIG. 2) which slidably support for longitudinal movement therealong a table 48. Fixed to base 20 is a cylinder 50 (FIG. 1) having a piston rod 52 which is attached to table 48 at 53 and is operative to reciprocate the table. Connected to table 48 is a grinding wheel dresser assembly 58 which may be of conventional design and is provided in a convenient location for dressing the grinding wheel 40. Table 48 has a dovetailed top surface 60 upon which tailstock 62 and headstock 64 are mounted.

Rotatably mounted in headstock 64 is a spindle 66 which is in geared relation to an anti-back lash motor 68. Connected to spindle 66 is an index head 70 of a conventional design for indexing the spindle, and hence the workpiece mounted between the centers of the tailstock and headstock, after the forming of each gear tooth. Sector 72 is connected through index head 70 to spindle 66 and is rotated during axial travel of table 48 to correspondingly rotate the workpiece by mechanism now to be described.

A bell crank and roller slide carrier 80 is mounted on table 48 for longitudinal sliding movement by the dovetail surface 78. A screw 82 is journalled for rotation on the table by the bearing block 84 and threads through the projecting part 86 on carrier 80 to adjust the carrier relative to the table by rotation of the screw. Locking screws 88 locate the carrier in adjusted position. Mounted for free vertical movement on carrier 80 is a slide 90 which supports a lower roller 92 engageable with the cam surface 94 of a longitudinally adjustable lead cam 96. Screws 98 engaging in the elongated slot 100 of the lead cam lock the latter to base 20 in adjusted position. The slide 90 has an upper roller 102 which is engageable with the lower surface of arm 104 of bell crank 106 pivoted to carrier 80 at 108.

A push rod 110 is mounted on table 48 for vertical sliding movement and has a roller 112 at the lower end positioned to engage the upper surface of arm 114 of the bell crank 106. At its upper end the push rod has a platform 116.

A bracket 118 is mounted on table 48 by dovetail surface 120 for movement transversely of the path of table movement and is moved by a screw 122 threadedly engaged therewith and journalled in a bearing 124 on the table. The bracket is formed to clear the push rod 110 so that the push rod will not interfere with the transverse movement of the bracket, and the bracket has a bushing 126 in which slides a vertical rod 128 secured to the band carrier 130. A vertical bolt 132 has a threaded connection with band carrier 130 for vertical adjustment thereof and its lower end engages the platform 116. The platform is long enough to be engaged by the bolt 132 throughout a substantial range of adjustment of bracket 118, as will be seen in FIG. 2.

A pair of bands 134 each have an end secured to an arm of bell crank 138 pivoted to the upper end of band carrier 130 and a pair of bands 136 each have an end secured to an arm of bell crank 140 pivoted to the lower end of the carrier 130. The bands 134 and 136 extend over the arcuate periphery of the sector 72 and are secured thereto at 142 and 144 respectively. Each of the bell cranks 138 and 140 have bolts 146 and 148 threadedly connected to the other arms thereof which bear against shoulders 150 and 152 of the carrier, and the angular position of the bell cranks can be varied by rotation of the bolts to adjust the tension on the bands.

In the operation of this embodiment, a workpiece such as a gear blank is placed between spindle 66 and tailstock 62. Fluid is supplied cylinder 50 to extend rod 52 and move table 48 leftwardly. Roller 92 will then move up the inclined cam surface 94 moving slide 90 upwardly and since roller 102 bears against the lower surface of bell crank arm 104, bell crank 106 is turned clockwise moving arm 114 against roller 112 to move push rod 110 upwardly. This moves band carrier 130 upwardly to rotate sector 72 and the workpiece as the workpiece moves longitudinally to form helical gear teeth thereon. The degree of the helix depends where the roller 112 engages bell crank arm 114 and hence upon the adjustment of the bell crank and slide carrier 80. The grinding wheel is of course angularly adjusted to correspond to the desired helix angle and forms the teeth by grinding the roots between, and the sides of, the teeth. Since the axes of rollers 102 and 112 and pivot axis 108 are parallel and lie in a common plane, the change in the degree of the helix angle will be directly proportional to the adjustment of the carrier 80. The bracket 118 can be adjusted to account for sectors of varying radius.

Figure 6:
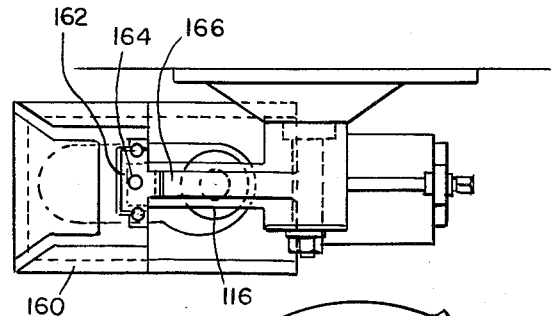
FIG. 6 is a partial plan view of the mechanism shown in FIG. 5.
Figure 5:
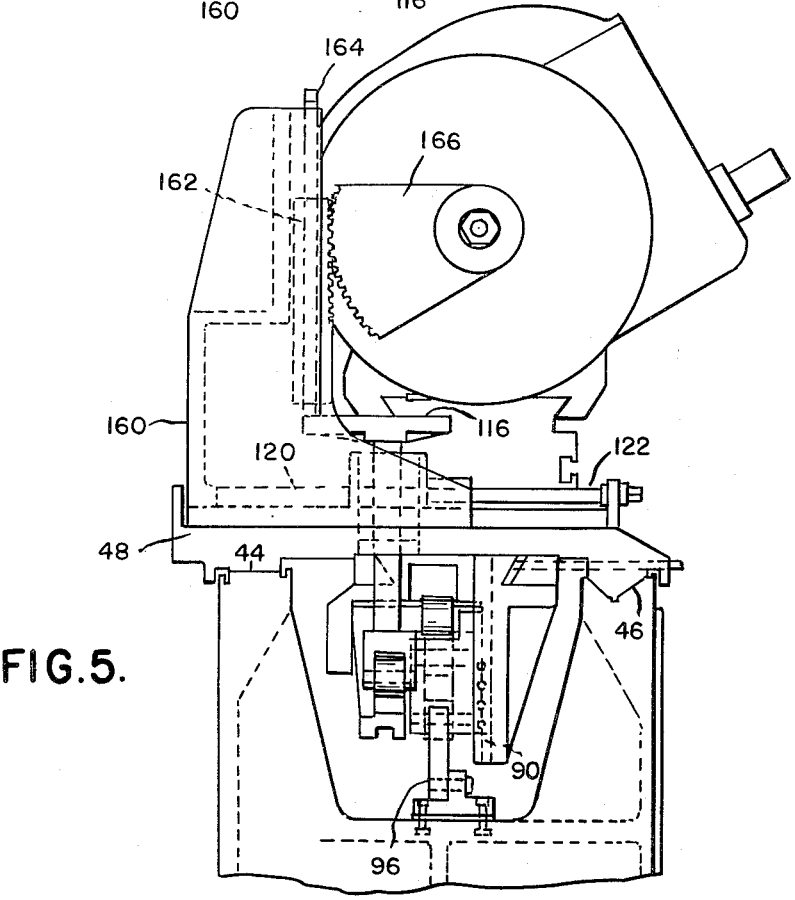
FIG. 5 is similar to FIG. 2 but shows a modification wherein a rack actuating mechanism is provided for the sector.

If desired, platform 116 may be engageable with a toothed rack which is mounted for vertical sliding movement in the bracket and which meshes with a toothed sector as shown in the modification of FIGS. 5 and 6. In this embodiment a bracket 160 is mounted along dovetailed surface 120 for transverse movement upon adjustment of screw 122. Slidably mounted in bracket 160 for vertical movement is a rack 162 threadedly engaged with an adjustment rod 164 which extends from either side thereof and has its lower end engaged with platform 116. Rack 162 is adjustable relative platform 116 through the rotation of adjustment rod 164. Rack 162 is in toothed engagement with sector 166 so that upon elevation of platform 116 due to the action outlined above, sector 166 will be rotated accordingly to form the helix. Otherwise the embodiment of FIGS. 5 and 6 is like FIGS. 1–4.

What we claim as our invention is:

1. In a machine of the type including a tool support and a workpiece support one of which is longitudinally movable relative to the other to cause a tool carried by the tool support to act on a surface of a workpiece carried by the workpiece support, apparatus for relatively transversely moving the tool and workpiece surface during movement of the movable support comprising a cam, a first follower carried by the longitudinally movable support positioned to engage and traverse said cam during movement of the movable support, a pivotal lever carried by the movable support, said first follower being engaged with said lever to rotate the latter according to the contour of said cam, a second follower movably carried by the movable support and engaged with said lever to be operated thereby, means operated by said second follower for relatively transversely moving the tool and workpiece surface, and means for varying the spacing at least between one of said followers and the pivotal axis of said lever to vary the leverage.

2. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a follower unit carried by the table positioned to engage and traverse said cam during movement of the table, a pivotal lever carried by said table, said follower unit being engaged with said lever to rotate the latter according to the contour of said cam, a follower movably carried by the table and engaged with said lever to be operated thereby, means operated by said follower for rotating the workpiece, and means for locating said follower unit and lever on said table in selected positions of adjustment toward and away from said follower to vary the leverage.

3. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a follower unit carried by said table and having a first follower positioned to engage and traverse said cam during movement of the table, a pivotal lever carried by the table, said follower unit having a second follower engaged with said lever to rotate the latter according to the contour of said cam, a third follower movably carried by the table and engaged with said lever to be operated thereby, means operated by said third follower for rotating the workpiece, and means for locating said follower unit and lever on said table in selected positions of adjustment toward and away from said third follower to vary the leverage.

4. In a machine of the type including a tool holder and a workpiece supporting table movable relative to the tool holder to remove material from a workpiece carried by the table by the action of a tool, carried by the tool holder, apparatus for rotating the workpiece during movement of the table comprising a cam, a support on the table, a follower unit carried by said support and having a first follower positioned to engage and traverse said cam during movement of the table, a lever pivoted to said support, said follower unit having a second follower engaged with said lever to rotate the latter according to the contour of said cam, a third follower movably carried by the table and engaged with said lever to be operated thereby, means operated by said third follower for rotating the workpiece, and means for locating said support on said table in selected positions of adjustment toward and away from said third follower to vary the leverage.

5. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a support on the table, a follower unit carried by said support and having a first follower positioned to engage and traverse said cam during movement of the table, a bell crank lever pivoted to said support, said follower unit having a second follower engaged with one arm of said lever to rotate the latter according to the contour of said cam, a third follower movably carried by the table and engaged with the other arm of said lever to be operated thereby, means operated by said third follower for rotating the workpiece, said second and third followers lying on a straight line through the axis of rotation of said lever in all positions of the latter, and means for locating said support on said table in selected positions of adjustment toward and away from said third follower to vary the leverage.

6. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a support on the table, a follower unit carried by said support and having a follower positioned to engage and traverse said cam during movement of the table, a bell crank lever pivoted to said support with its arms extending longitudinally relative to the path of movement of the table, said follower unit having a roller follower engaged with one arm of said lever to rotate the latter according to the contour of said cam, a second roller follower reciprocably carried by the table and engaged with the other arm of said lever to be reciprocated thereby, means operated by said second roller follower for rotating the workpiece, the axes of said roller followers lying on a straight line through the axis of rotation of said lever in all positions of the latter, and means for locating said support on said table in selected positions of adjustment longitudinally with respect to the path of movement of the table to vary the leverage.

7. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a support on the table, a follower unit carried by said support and having a follower positioned to engage and traverse said cam during movement of the table, a bell crank lever pivoted to said support with its arms extending longitudinally relative to the path of movement of the table, said follower unit having a roller follower engaged with one arm of said lever to rotate the latter according to the contour of said cam, a second roller follower reciprocably carried by the table and engaged with the other arm of said lever to be reciprocated thereby, means operated by said second roller follower for rotating the workpiece, the axes of said roller followers lying on a straight line through the axis of rotation of said lever in all positions of the latter, means for locating said support on said table in selected positions of adjustment longitudinally with respect to the path of movement of the table to vary the leverage, said rotating means including a platform carried by said second roller follower for reciprocation therewith, a reciprocable member on said table movable generally parallel to said second roller follower and platform and positioned to be engaged by said platform for movement thereby, an arcuate rotatable member on said table adapted to rotate the workpiece, said rotatable member projecting radially from its axis of rotation, means connecting said reciprocable member to the arcuate periphery of the rotatable member to transmit the reciprocation of the former into rotation of the latter, and means for adjustably positioning said reciprocable member transversely with respect to the axis of rotation of said rotatable member as determined by the radial extent of said rotatable member, said platform being relatively wide to accommodate a predetermined range of adjustment of said reciprocable member.

8. In a machine of the type including a tool holder and a workpiece supporting table movable relative to the tool holder to remove material from a workpiece carried by the table by the action of a tool carried by the tool holder, apparatus for rotating the workpiece during movement of the table comprising a cam, a follower unit carried by the table positioned to engage and traverse said cam during movement of the table, a pivotal lever carried by said table, said follower unit being engaged with said lever to rotate the latter according to the contour of said cam, a follower reciprocably carried by the table and engaged with said lever to be operated thereby, means operated by said follower for rotating the workpiece, said rotating means including a platform carried by said follower for reciprocation therewith, a reciprocable member on said table movable generally parallel to said follower and platform and positioned to be engaged by said platform for movement thereby, an arcuate rotatable member on said table adapted to rotate the workpiece, said rotatable member projecting radially from its axis of rotation, means connecting said reciprocable member to the arcuate periphery of said rotatable member to transmit the reciprocation of the former into rotation of the latter, and means for adjustably positioning said reciprocable member transversely with respect to the axis of rotation of said rotatable member as determined by the radial extend of said rotatable member, said platform being relatively wide to accommodate a predetermined range of adjustment of said reciprocable member.

9. In a machine of the type including a tool holder and a workpiece supporting table movable relative to each other to cause a tool carried by the tool holder to traverse a workpiece carried by the table and act thereon, apparatus for rotating the workpiece during such relative movement including a reciprocable platform carried by said table, means for reciprocating said platform in accordance with the relative movement of said tool holder and table, a reciprocable member on said table movable generally parallel to said platform and positioned to be engaged by said platform for movement thereby, an arcuate rotatable member on said table adapted to rotate the workpiece, said rotatable member projecting radially from its axis of rotation, means connecting said reciprocable member to the arcuate periphery of said rotatable member to transmit the reciprocation of the former into rotation of the latter, and means for adjustably positioning said reciprocable member transversely with respect to the axis of rotation of said rotatable member as determined by the radial extent of said rotatable member, said platform being relatively wide to accommodate a predetermined range of adjustment of said reciprocable member.

10. In a machine of the type including a tool support and a workpiece support relatively movable in a first direction to cause a tool carried by the tool support to act on a surface of a workpiece carried by the workpiece support, apparatus for relatively moving the tool and workpiece surface in a direction transverse to said first direction during relative movement of said supports in said first direction comprising a cam carried by one of said supports, a first follower carried by the other support positioned to engage and traverse said cam during relative movement of said supports in said first direction, a pivotal lever carried by said other support, said first follower being engaged with said lever to rotate the latter according to the contour of said cam, a second follower carried by said other support and engaged with said lever to be operated thereby, means operated by said second follower for relatively moving the tool and workpiece surface in said transverse direction, and means for varying the spacing at least between one of said followers and the pivotal axis of said lever to vary the leverage.

11. In a machine of the type including a tool support and a workpiece support movable relative to each other to cause a tool carried by the tool support to traverse a workpiece carried by the workpiece support and act thereon, apparatus for rotating the workpiece during relative movement of the supports including a reciprocable platform carried by the workpiece support, means for reciprocating said platform in accordance with the relative movement of the supports, a reciprocable member on the workpiece support movable generally parallel to said platform and positioned to be engaged by said platform for movement thereby, an arcuate rotatable member on the workpiece support adapted to rotate the workpiece, said rotatable member projecting radially from its axis of rotation, means connecting said reciprocable member to the arcuate periphery of said rotatable member to transmit the reciprocation of the former into rotation of the latter, and means for adjustably positioning said reciprocable member transversely with respect to the axis of rotation of said rotatable member as determined by the radial extent of said rotatable member, said platform being relatively wide to accommodate a predetermined range of adjustment of said reciprocable member.

12. In a machine of the type including a tool support and a workpiece support movable relative to each other to cause a tool carried by the tool support to traverse a workpiece carried by the workpiece support and act thereon, apparatus for rotating the workpiece during relative movement of the supports including a reciprocable platform carried by the workpiece support, means for reciprocating said platform in accordance with the relative movement of the supports, a reciprocable member on the workpiece support movable generally parallel to said platform and positioned to be engaged by said platform for movement thereby, a movable member on the workpiece support adapted to rotate the workpiece, means for connecting said reciprocable member to said movable member to move the latter in accordance with the movement of said reciprocable member, and means for locating said reciprocable member in selected positions of adjustment toward and away from said movable member as required to enable the aforesaid connection therebetween, said platform being relatively wide to accommodate a predetermined range of adjustment of said reciprocable member.

References Cited in the file of this patent
UNITED STATES PATENTS

| | | |
|---|---|---|
| 1,405,852 | Maag et al. | Feb. 7, 1922 |
| 1,870,764 | Aeppli | Aug. 9, 1932 |
| 2,452,123 | Hjelmblad | Oct. 26, 1948 |